United States Patent [19]

Stenzel et al.

[11] 4,077,908

[45] Mar. 7, 1978

[54] PRODUCTION OF MATERIAL CONSISTING OF SOLID HOLLOW SPHEROIDS

[75] Inventors: Jürgen Stenzel, Erftstadt Liblar; Arnulf Hinz, Hurth-Knapsack, both of Germany

[73] Assignee: Hoechst Aktiengesellschaft, Frankfurt am Main, Germany

[21] Appl. No.: 720,346

[22] Filed: Sep. 3, 1976

[30] Foreign Application Priority Data

Oct. 26, 1973 Germany .............................. 2353631

Related U.S. Application Data

[63] Continuation of Ser. No. 536,735, Dec. 27, 1974, abandoned, which is a continuation-in-part of Ser. No. 517,213, Oct. 23, 1974, abandoned.

[51] Int. Cl.$^2$ .............................................. B01J 29/06
[52] U.S. Cl. ......................... 252/455 R; 252/477 R; 423/213.5; 423/628
[58] Field of Search ............... 252/448, 455 R, 477 R, 252/463; 423/628, 213.5; 104/41

[56] References Cited

U.S. PATENT DOCUMENTS

| | | | |
|---|---|---|---|
| 2,553,759 | 5/1951 | Geiger | 106/41 |
| 3,035,301 | 5/1962 | Rodis et al. | 18/1 |
| 3,467,602 | 9/1969 | Koester | 252/455 R |
| 3,869,410 | 3/1975 | Bunda et al. | 423/213.5 X |

*Primary Examiner*—Carl F. Dees
*Attorney, Agent, or Firm*—Connolly and Hutz

[57] ABSTRACT

Production of solid, hollow and spheroidic material for use as a carrier supporting motor exhaust gas decontamination catalysts. To this end, spheroidal particles of material being oxidizable and/or low melting and/or soluble in organic solvents are placed on to a pelletizing table. Ceramic pulverulent material is distributed thereover and a aqueous cellulose ether solution is simultaneously sprayed thereonto to cause deposition of the ceramic material on the particles. The resulting pellets are dried at 20° – 95° C and freed from material being oxidizable and/or low melting and/or soluble in organic solvents, and finally calcined at 1000° – 1500° C.

13 Claims, No Drawings

PRODUCTION OF MATERIAL CONSISTING OF SOLID HOLLOW SPHEROIDS

This application is a continuation of application Ser. No. 536,735 filed Dec. 27, 1974, now abandoned which is a continuation in part of application Ser. No. 517,213 filed Oct. 23, 1974 now abandoned.

The present invention relates to the production of a carrier material consisting of solid hollow and spheroidic particles supporting catalysts used in the decontamination of motor exhaust gas.

To initiate a chemical reaction, it is necessary for a catalyst to be heated to a temperature higher than its so-called starting temperature. In the catalytic decontamination of motor exhaust gases, it is customary for the catalyst to be heated up to starting temperature by means of the heat inherent to the exhaust gas. On the other hand, it is known that a cold motor just started produces very noxious exhaust gas. It is therefore highly desirable for the total quantity of catalyst and carrier, which is to be heated up, to be minimized by applying the catalytically active substance to a minimum quantity of ceramic material.

To achieve this, it has been proposed (cf. German Patent Specifications 1 097 344 and 1 187 535) to use honey comb structures as the catalyst carrier having the active substance applied to long parallel passageways through which the exhaust gas is forced to flow. This is not fully satisfactory, however, as the passageways do not provide for the direction of flow of the gas to be inversed therein, and accordingly do substantially not provide for turbulent flow of the gas travelling therethrough whereby complete conversion of the gas is rendered impossible. It should be added that technically expensive methods are required to be used for making honey comb structures.

Filler catalysts, which permit the direction of flow of a gas travelling therethrough to be continually inversed, have preferably been used heretofore in an attempt to achieve complete gas conversion. Filler catalysts are also not fully satisfactory in view of the fact that the total catalyst mass is required to be heated up to starting temperature while only the outer peripheral zones are utilized catalytically, especially at elevated temperatures.

The present invention now provides a process for making a catalyst carrier, which is free from the adverse effects referred to hereinabove and enables the direction of flow of a gas travelling therethrough to be continually inversed so as to effect turbulent gas flow and effective gas conversion in contact with the catalytically active substance, wherein the catalytically active substance is applied to a minimum quantity of a ceramic carrier, whereby the total quantity of catalyst and carrier is minimized.

The process of the present invention comprises more particularly: placing spheroidal particles of material being oxidizable and/or low-melting and/or soluble in organic solvents on to a pelletizing table; distributing pulverulent ceramic material thereover and simultaneously spraying an aqueous cellulose ether solution thereonto, thereby causing deposition of the pulverulent ceramic material on the spheroidal particles; drying the resulting pellets at temperatures within the range 20° and 95° C, preferably 40° and 85° C; freeing the pellets from the material being oxidizable and/or low-melting and/or soluble in organic solvents; and calcining the pellets at temperatures within the range 1000° and 1500° C.

Further preferred features of the process of the present invention provide:

a. for the spheroidal particles, which are placed on to the pelletizing table, to consist of sawdust;
b. for the spheroidal particles, which are placed on to the pelletizing table, to consist of granular plastic material;
c. for polyethylene to be used as the granular plastic material;
d. for polystyrene to be used as the granular plastic material;
e. for the spheroidal particles, which are placed on to the pelletizing table, to have a diameter within the range 1 and 5 mm, preferably 2 and 4 mm,
f. for aluminium hydroxide to be used as the ceramic material;
g. for hydrous aluminium silicate to be used as the ceramic material;
h. for mixtures of aluminium hydroxide and hydrous aluminium silicate to be used as the ceramic material;
i. for a 1% aqueous cellulose ether solution to be sprayed on to the spheroidal particles; and
j. for methyl cellulose to be used as the cellulose ether.

The invention also provides for the use of spheroidal hollow particles which have a wall thickness of at least 1 mm and which are therefore very strong. The diameter of the spheroidal hollow particles is within the range 2 and 10 mm. Loosely aggregated hollow spheroids offer as little resistance to flowing gas as solid spheroids, but they have lower bulk density and an enlarged inner surface area.

The following Examples illustrate the invention. The inner surface areas referred to therein have all been identified by the method described by Brunauer, Emmet and Teller in J.Am.Chem.Soc. 60 (1938) p. 309.

EXAMPLE 1

Spheroidal particles having a diameter within the range 2 and 4 mm, prepared from agglomerated sawdust, were placed on to a pelletizing table (1 m in diameter; inclined at an angle of 30°; 12 rpm). A mixture of hydrargillit ($\alpha$-aluminium hydroxide) and 5 weight % of bentonite (hydrous aluminium silicate) was distributed thereover and a 1% aqueous methylcellulose solution was simultaneously sprayed thereonto, whereby the ceramic mixture was caused to deposit on the sawdust particles. The resulting pellets were sieved to remove all fractions having a diameter within the range 5 and 7 mm which were dried for 12 hours at 80° C. Following this, they were heated at increasing temperatures (50° C per hour) to 500° C and finally calcined for 10 hours at 1420° C.

The hollow spheroids so made had a diameter within the range 3.5 and 5 mm, a wall thickness within the range 1.2 and 2 mm, a strength within the range 0.5 and 2.5 kg/mm of spheroid diameter, an apparent density of 0.58 g/cc and an inner surface area of 2.0 m²/g.

EXAMPLE 2

Substantially spherical polyethylene granules having a diameter of about 2.5 mm were placed on the pelletizing table described in Example 1. A mixture of hydrargillit and 5 weight % of bentonite was distributed thereover and a 1% aqueous methylcellulose solution was simultaneously sprayed thereonto, whereby the ceramic mixture was caused to deposit on the polyethylene granules. The resulting pellets were sieved so as to remove all fractions having a diameter within the range 4.5 and 5.5 mm which were dried for 3 hours at 85° C. Following this, they were heated at increasing temperatures (100° C/hour) to 450° C and finally calcined for 17 hours at 1450° C.

The resulting hollow spheroids had a diameter within the range 4 and 4.5 mm, a wall thickness within the range 1 and 2 mm, an average strength of 2.8 kg/mm of spheroid diameter, an apparent density of 0.62 g/cc and an inner surface area of 2.1 m²/g.

EXAMPLE 3

Spheroidal expandable polystyrene sieve fractions having a diameter within the range 0.2 and 0.1 mm were allowed to expand for 30 minutes at 135° C, in a drying cabinet.

The spheroids so expanded to about 50 times their initial volume were sieved and the sieve fraction having a diameter within the range 1.0 and 1.5 mm was placed on to the pelletizing table described in Example 1. Fine particulate, partially dehydrated reactive aluminium hydroxide (marketed under the designation Alcoa A 16 by Aluminium Company of America) was poured thereover by means of a chute and a 1% aqueous solution of methylcellulose and a dispersant (1% of Dolapix CA marketed by Zschimmer and Schwarz) was simultaneously sprayed thereonto, whereby the pulverulent ceramic material was caused to deposit on the plastic spheroids so as to form a shell around them. The resulting pellets were dried for 12 hours at 80° C, heated at increasing temperatures (50° C/hour) to 500° C and finally calcined for 10 hours at 1250° C.

The resulting hollow spheroids had a strength within the range 1.0 and 3.5 kg/mm of spheroid diameter, an inner surface area of 2.5 m²/g, a wall thickness within the range 1 and 2 mm, and an apparent density of 0.65 g/cc.

EXAMPLE 4

Polystyrene expanded and coated with Alcoa A 16 in the manner described in Example 3 was dried and dipped once in acetone. The organic solvent effected the collapse of the polystyrene nucleus. It was not necessary for the polystyrene to be extracted completely.

Once the acetone was found to have dropped off, the pellets were heated at increasing temperatures (50° C/hour) to 500° C and calcined for 10 hours at 1250° C.

The resulting hollow spheroids had a strength within the range 1 and 3.5 kg/mm of spheroid diameter, an inner surface area of 2.5 m²/g, a wall thickness within the range 1 and 2 mm, and an apparent density of 0.55 g/cc.

EXAMPLE 5

The carrier material produced in the manner described in Example 3 was used to support a catalyst for the removal of nitrogen oxides from motor exhaust gas.

To this end, 100 g of carrier material was heated to 350° C and introduced into a hot concentrated solution of 143 g of $Cu(NO_3)_2 \cdot 3\ H_2O$
161 g if $Ni(NO_3)_2 \cdot 6\ H_2O$ and
139 g of $Mn(NO_3)_2 \cdot 4\ H_2O$ in 400 cc of water. After 30 minutes, the solution in excess was poured off and the carrier impregnated with the above active ingredients was dried for 2 hours at 130° C in a circulating air drying cabinet. Following this, the nitrates were decomposed within 2 hours in a muffle furnace by increasing the temperature to 450° C. The temperature was then further increased to 850° C and the material was kept at that temperature, for 17 hours. The catalyst so made was heated for 30 minutes at 350° C in a hydrogen/nitrogen-stream (10% $H_2$; balance $N_2$) and successively cooled under nitrogen. The carrier underwent a 16.3% increase in weight. In other words, the catalyst contained 16.3% in weight of active ingredients.

The performance of catalyst so produced was tested in a testing apparatus in which it was contacted, at a spatial velocity of 24,000 l of gas per liter of catalyst per hour, with a test gas composed of:

1000 ppm of NO,
0.5 % by volume of $O_2$,
2.5 % by volume of CO,
2.5 % by volume of $H_2$,
the balance being $N_2$.

The gas and catalyst in the testing apparatus were heated while increasing the temperature at a rate of 100° C/h. The temperature and composition of the gas were continually identified ahead and downstream of the catalyst.

The following results were obtained:

| Test time in min. | Cat. temp. ° C | Test gas ahead and downstream catalyst ppm. | | %NO-removal |
| --- | --- | --- | --- | --- |
| 0 | 21 | 954 | 953 | — |
| 15 | 32 | 952 | 951 | — |
| 45 | 84 | 950 | 949 | — |
| 60 | 108 | 948 | 946 | — |
| 90 | 158 | 949 | 943 | — |
| 115 | 201 | 950 | 940 | 1 |
| 135 | 235 | 950 | 874 | 8 |
| 143 | 248 | 951 | 790 | 17 |
| 146 | 253 | 951 | 628 | 34 |
| 151 | 261 | 950 | 428 | 55 |
| 157 | 270 | 950 | 323 | 66 |
| 166 | 286 | 951 | 167 | 83 |
| 195 | 301 | 951 | 125 | 87 |
| 182 | 335 | 952 | 79 | 92 |
| 205 | 355 | 953 | 50 | 95 |

We claim:

1. A process for making carrier material supporting motor exhaust gas decontamination catalysts, said carrier consisting essentially of solid hollow globules, which process comprises placing starting material consisting of spheroidal particles of sawdust having a diameter within the range 1 and 5 mm on to a pelletizing table, and spraying an aqueous cellulose ether solution thereonto so as to wet the particles' surface; distributing pulverized aluminum hydroxide, hydrous aluminum silicate or mixtures thereof over the wetted surface of the spheroidal sawdust particles; thereby causing said aluminum hydroxide, hydrous aluminum silicate or mixtures thereof to deposit on said sawdust particles; drying the resulting pellets at temperatures within the range 20° and 95° C; burning out the sawdust from the pellets; and calcining the pellets at temperatures within the range 1000° and 1500° C with the resultant formation of said solid hollow globules having an inner diameter within the range 2 to 10 mm and a wall thickness of at least 1 mm.

2. The process as claimed in claim 1, wherein the spheroidal sawdust particles have a diameter within the range of 2 and 4 mm.

3. The process as claimed in claim 1, wherein a 1% aqueous cellulose ether solution is sprayed on to the spheroidal sawdust particles.

4. The process as claimed in claim 1, wherein methyl cellulose is used as the cellulose ether.

5. The process as claimed in claim 1, wherein the pellets are dried at 40° – 85° C.

6. A process for making carrier material supporting motor exhaust gas decontamination catalysts, said carrier consisting essentially of solid hollow globules, which process comprises placing starting material consisting of granular spheroidal polyethylene or polystyrene particles having a diameter within the range 1 and 5 mm on to a pelletizing table, and spraying an aqueous cellulose ether solution thereonto so as to wet the particles' surface; distributing pulverized aluminum hydroxide, hydrous aluminum silicate or mixtures thereof over the wetted surface of the granular spheroidal polyethylene or polystyrene particles; thereby causing said aluminum hydroxide, hydrous aluminum silicate or mixtures thereof to deposit on said polyethylene or polystyrene particles; drying the resulting pellets at temperatures within the range 20° and 95° C, freeing the pellets of the granular spheroidal polyethylene or polystyrene particles; and calcining the pellets at temperatures within the range 1000° and 1500° C with the resultant formation of said hollow globules having an inner diameter within the range 2 to 10 mm and a wall thickness of at least 1 mm.

7. The process as claimed in claim 6, wherein the pellets are freed of said granular particles by oxidizing the latter.

8. The process as claimed in claim 6, wherein the pellets are freed of said granular particles by melting the latter.

9. The process as claimed in claim 6, wherein the pellets are freed of said granular particles by dissolving the latter with an organic solvent.

10. The process as claimed in claim 6, wherein said granular particles have a diameter within the range 2 and 4 mm.

11. The process as claimed in claim 6, wherein a 1% aqueous cellulose ether solution is sprayed on to said granular particles.

12. The process as claimed in claim 6, wherein methyl cellulose is used as the cellulose ether.

13. The process as claimed in claim 6, wherein the pellets are dried at 40° – 85° C.

* * * * *